Figure 1:
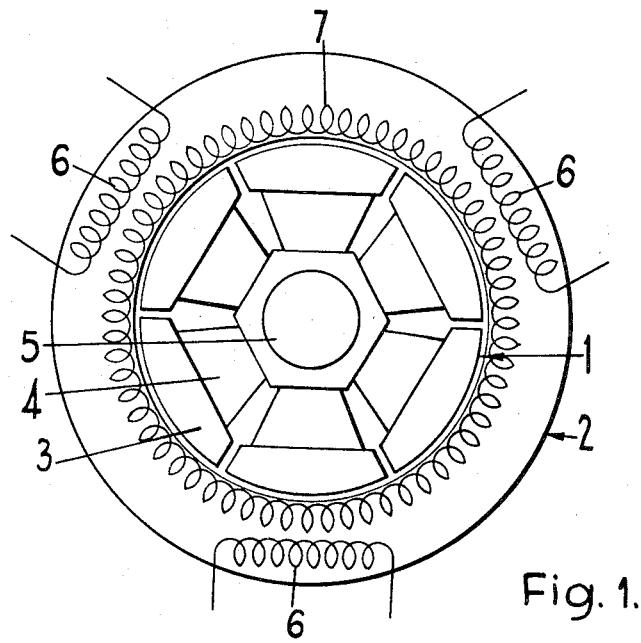

Jan. 6, 1959  J. P. HUGGARD ET AL  2,867,760
ELECTRIC MOTORS
Filed Jan. 10, 1957

INVENTORS
Joseph Pritchard Huggard
Peter Scott
BY Fischstein, Fischstein & Ottinger
ATTORNEYS

United States Patent Office 2,867,760
Patented Jan. 6, 1959

2,867,760

ELECTRIC MOTORS

Joseph Pritchard Huggard and Peter Scott, Birmingham, England, assignors to The General Electric Company Limited, London, England Application January 10, 1957, Serial No. 633,452

Claims priority, application Great Britain January 11, 1956

6 Claims. (Cl. 318—169)

This invention relates to electric motors and more particularly to alternating current electric motors.

In some circumstances, for example in the case of an electrically driven winch, a load normally driven by a motor may run away if the power supply to the electric motor fails and means, such as automatically operating mechanical brakes, must be provided for preventing the load damaging either itself or the motor or other associated apparatus. However, it is not always convenient to provide an automatically operating mechanical brake and an object of the present invention is the provision of an alternating current electric motor which is capable itself of providing a braking effect if the alternating current supply to the motor fails.

According to the present invention, in an electric motor having rotor and stator components, one component is provided with a permanent magnet field system or a field system arranged to be energised from a direct current supply independently of a main alternating or pulsating direct current supply for the motor, and the other component is provided with two windings or two sets of windings, one winding or set of windings being arranged to be energised from the said main supply and the other winding or set of windings forming a closed circuit or circuits such that upon failure of the main supply and rotation of the rotor component by a load associated with the motor, the interaction of the permanent magnet or direct current field system with the said other winding or set of windings is arranged to produce a braking effect.

In general and in order to avoid the necessity for slip-rings or the like, the rotor component is provided with a multi-polar permanent magnet system so arranged that the magnetic field from the magnetic poles intersects the windings of the stator component.

The motor may be a polyphase machine and conveniently it may have a stator component provided with a three phase winding arranged to be energised from a three phase alternating current or pulsating direct current supply, which may be of variable frequency for operating the motor at variable speeds, so as to drive the motor component in such a way that the motor operates under normal conditions as a synchronous machine. The three phase winding may be arranged in any standard known manner on the stator component and, associated with this winding, there may be a closed winding, wound suitably in some or all the slots of the three phase winding so as to provide a closed circuit for emergency braking upon failure of the main supply to the three phase winding.

Figure 2:
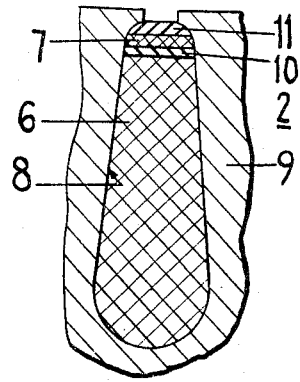

An electric motor in accordance with the present invention will now be described by way of example with reference to the two figures of the accompanying drawing in which Figure 1 shows a diagrammatic end view of the motor, the stator component and its windings being indicated schematically, and Figure 2 shows an enlarged detailed section of the arrangement in one of the slots of the stator component.

Referring now to Figure 1, the electric motor has a rotor component 1 and a stator component 2. The rotor component 1 is provided with a permanent magnetic field system which is multi-polar; in the example shown, there are six salient pole shoes 3 secured through permanent magnets 4 to a shaft 5. Damping rings (not shown) of copper or aluminum, either closed or in segments joining adjacent pole shoes, may be used to connect the pole shoes at opposite ends of the rotor. The permanent magnet system is so arranged that the magnetic field from the pole shoes 3 intersects the windings of the stator component 2. There are two of these windings, one winding 6 being a three phase winding arranged to be energised from a main three phase alternating current supply for the motor so as to drive the rotor component 1 in such a way that the motor operates under normal conditions as a synchronous machine. The speed of the motor may then be varied by arranging for the supply to be of variable frequency.

The other winding of the stator component 2 is a closed winding 7. The winding 6 is arranged in any standard known manner on the stator component 2 and, depending upon this arrangement, the closed winding 7 may conveniently be associated with the winding 6 by being wound suitably in some or all of the slots of the three phase winding. This is illustrated in Figure 2, which shows a slot 8 in the iron structure 9 of the stator component 2. Inside this slot 8 is arranged the three phase winding 6 separated by insulation 10 from the closed cage winding 7, which has a further outer layer of insulation 11.

The winding 7 is designed to provide a closed circuit for emergency braking upon failure of the main supply to the three phase winding 6. A load (not shown) is associated with the motor; for example, a motor may drive a winch on which is wound a cable carrying a load. If now the main supply fails while the motor is driving the load, so that the rotor component 1 is rotated by the load as it commences to run away, the interaction of the permanent magnetic field system of the rotor component 1 with the winding 7 is arranged to produce a braking effect. The braking torque exerted on the load under these conditions is dependent upon the power dissipation in the closed winding 7, and by suitable design of the permanent magnetic field system of the rotor component 1 and of the closed winding 7 a desired braking effect may be achieved.

Several modifications of the invention are possible; for example, the winding and field system arrangements on the rotor and stator components 1, 2 may be exchanged. A field system arranged to be energised from a direct current supply independently of the main supply for the motor may be used instead of the permanent magnet field system.

We claim:

1. An electric motor comprising rotor and stator components, one component having a permanent magnet field system and the other component being provided with two windings, one winding being adapted to be energised from a main electric supply for the motor, and the other winding forming a closed circuit adapted to interact with the permanent magnet field system and produce a braking effect when the main supply for the motor fails and the rotor component is rotated by a load associated therewith.

2. An electric motor comprising rotor and stator components, the rotor component having a multi-polar permanent magnet field system and the stator component being provided with two windings, one winding being adapted to be energised from a main electric supply for the motor, and the other winding forming a closed circuit adapted to interact with the permanent magnet field system and produce a braking effect when the main supply for the motor fails and the rotor component is rotated by a load associated therewith.

3. An electric motor comprising rotor and stator components, the rotor component having a multi-polar permanent magnet field system and the stator component being provided with two windings, one winding being a three phase winding adapted to be energised from a three phase alternating current supply so that the motor operates under normal conditions as a synchronous machine, and the other winding forming a closed circuit adapted to interact with the permanent magnet field system and produce a braking effect when the main supply for the motor fails and the rotor component is rotated by a load associated therewith.

4. An electric motor comprising rotor and stator components, the rotor component having a multi-polar permanent magnet field system and the stator component being provided with two windings, one winding being a three phase winding adapted to be energised from a three phase alternating current supply so that the motor operates under normal conditions as a synchronous machine, and the other winding being closed and wound in at least some of the slots provided in the stator for the three phase winding, the said other winding forming a closed circuit adapted to interact with the permanent magnet field system and produce a braking effect when the main supply for the motor fails and the rotor component is rotated by a load associated therewith.

5. An electric motor comprising rotor and stator components, one component having a field system adapted to be energised from a direct current supply independently of a main electric supply for the motor, and the other component being provided with two windings, one winding being adapted to be energised from the said main electric supply for the motor and the other winding forming a closed circuit adapted to interact with the permanent magnet field system and produce a braking effect when the main supply for the motor fails and the rotor component is rotated by a load associated therewith.

6. An electric motor comprising rotor and stator components, one component having a permanent magnet field system and the other component being provided with two windings, one winding being adapted to be energised from a main alternating current supply of variable frequency for operating the motor at variable speed, and the other winding forming a closed circuit adapted to interact with the permanent magnet field system and produce a braking effect when the main supply for the motor fails and the rotor component is rotated by a load associated therewith.

No references cited.